(12) United States Patent
Lin et al.

(10) Patent No.: US 11,371,897 B2
(45) Date of Patent: Jun. 28, 2022

(54) DEVICE FOR MEASURING LIQUID SLOSHING FORCE OF SHIP

(71) Applicant: Dalian University of Technology, Dalian (CN)

(72) Inventors: Yan Lin, Dalian (CN); Xiaoning Jiang, Dalian (CN); Fei Pei, Dalian (CN); Linmao Zhang, Dalian (CN); Xuanyi Bian, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 174 days.

(21) Appl. No.: 16/984,183

(22) Filed: Aug. 4, 2020

(65) Prior Publication Data

US 2021/0278299 A1 Sep. 9, 2021

(30) Foreign Application Priority Data

Mar. 9, 2020 (CN) .......................... 202010158847.8

(51) Int. Cl.
*G01L 5/04* (2006.01)
(52) U.S. Cl.
CPC ..................................... *G01L 5/04* (2013.01)
(58) Field of Classification Search
CPC ......... G01L 5/04; G01L 5/0052; G01L 23/00; B63B 71/20; G01M 10/00
See application file for complete search history.

(56) References Cited

U.S. PATENT DOCUMENTS

| 5,560,161 A * | 10/1996 | Lou | E04H 9/0215 52/167.2 |
| 11,262,322 B2 * | 3/2022 | Lin | G01N 25/18 |
| 2008/0307855 A1 * | 12/2008 | Friedman | G01M 17/0074 73/12.09 |

* cited by examiner

*Primary Examiner* — Freddie Kirkland, III
(74) *Attorney, Agent, or Firm* — Matthias Scholl P.C.; Matthias Scholl

(57) ABSTRACT

A device for measuring liquid sloshing force of a ship transporting liquid. The device includes a first cuboidal frame; a second cuboidal frame; a rotating mechanism; a dynamometer; and a liquid tank disposed in the second cuboidal frame. The second cuboidal frame is pivotally connected to the first cuboidal frame via the rotating mechanism. The first cuboidal frame includes a first horizontal plane frame, a second horizontal plane frame, a plurality of upright tubes connecting the first horizontal plane frame and the second horizontal plane frame, and an X-shaped support rod disposed between the first horizontal plane frame and the second horizontal plane frame. The second cuboidal frame includes a third horizontal plane frame including two longitudinal beams and two transverse beams, a longitudinal U-shaped bar disposed between the two transverse beams, and a plurality of transverse U-shaped bars disposed between the two longitudinal beams.

7 Claims, 17 Drawing Sheets

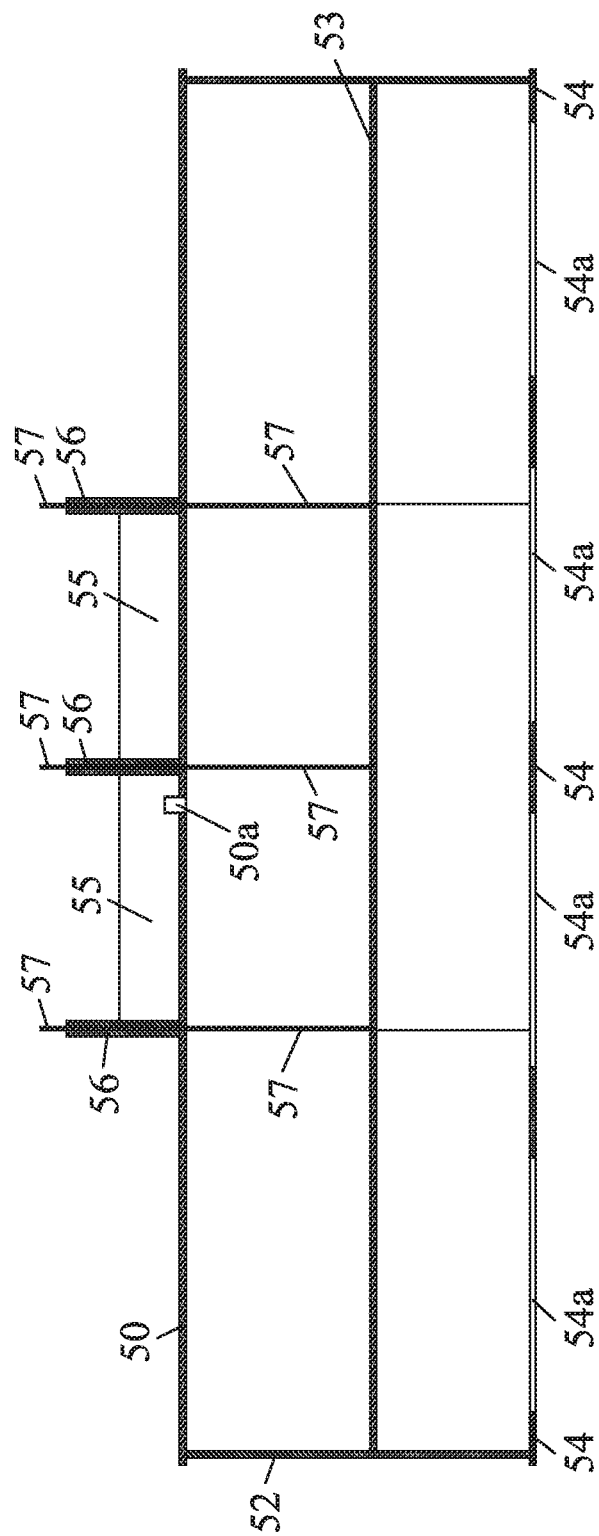

DEVICE FOR MEASURING LIQUID SLOSHING FORCE OF SHIP

CROSS-REFERENCE TO RELATED APPLICATIONS

Pursuant to 35 U.S.C. § 119 and the Paris Convention Treaty, this application claims foreign priority to Chinese Patent Application No. 202010158847.8 filed Mar. 9, 2020, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to a device for measuring liquid sloshing three of a ship.

Sloshing refers to the movement of liquid inside an object such as a ship transporting liquid. Liquid sloshing adversely influences the safety performance of ships.

SUMMARY

The disclosure provides a device for measuring liquid sloshing force of a ship transporting liquid.

The device comprises a first cuboidal frame; a second cuboidal frame; a rotating mechanism; a dynamometer; and a liquid tank disposed in the second cuboidal frame.

The second cuboidal frame is pivotally connected to the first cuboidal frame via the rotating mechanism; the first cuboidal frame comprises a first horizontal plane frame, a second horizontal plane frame, a plurality of upright tubes connecting the first horizontal plane frame and the second horizontal plane frame, and an X-shaped support rod disposed between the first horizontal plane frame and the second horizontal plane frame; the second cuboidal frame comprises a third horizontal plane frame comprising two longitudinal beams and two transverse beams, a longitudinal U-shaped bar disposed between the two transverse beams, and a plurality of transverse U-shaped bars disposed between the two longitudinal beams; and the plurality of transverse U-shaped bars is supported by the longitudinal U-shaped bar.

The rotating mechanism comprises a connection plate, a bearing seat comprising an axle hole and being fixed on the connection plate, and a hinge pin; the X-shaped support rod comprises a junction and the connection plate is fixed on the junction; the hinge pin comprises a first end fixed on one of the two longitudinal beams and a second end disposed in the axle hole of the bearing seat.

The dynamometer comprises a tensiometer, a first regulator, and a second regulator; the tensiometer is disposed between the first regulator and the second regulator; the first regulator is connected to the first horizontal plane frame, and the second regulator is connected to the third horizontal plane frame; the liquid tank comprises a faceplate, two first side plates, two second side plates, a first base plate, a second base plate, a guide plate, and a baffle plate; the faceplate, the two first side plates, the two second side plates and the second base plate are connected to each other to form a compartment, and the first base plate is disposed in the compartment to divide the compartment into a first compartment and a second compartment; the guide plate is vertically disposed on the faceplate; the guide plate comprises a slot, and the first base plate comprises a surface having a groove; the baffle plate is disposed in the slot and extends into the groove; the faceplate comprises a ventilation hole; and the first base plate comprises a drain hole.

The first horizontal plane frame comprises two first longitudinal beams and two first transverse beams; the second horizontal plane frame comprises two second longitudinal beams and two second transverse beams; four ends of the X-shaped support rod are connected to one of the two first longitudinal beams and one of the two second longitudinal beams, respectively; and the two second longitudinal beams each comprise a support leg.

The connection plate comprises four corners and the X-shaped support rod comprises four bars respectively disposed on the four corners.

The second cuboidal frame further comprises a diagonal brace and a plurality of support plates; the plurality of transverse U-shaped bars is fixed on the diagonal brace; and the plurality of support plates is clamped between two ends of each of the plurality of transverse U-shaped bars, respectively.

The dynamometer further comprises a first suspension ring connected to the first regulator and fixed on a middle part of one of the two first transverse beams via a first bolt, and a second suspension ring connected to the second regulator and fixed on a middle part of one of the two transverse beams via a second bolt.

The bearing seat is fixed on the connection plate through a plurality of connecting bolts and nuts.

The liquid tank comprises three guide plates, three baffle plates, and four side plates; the second base plate comprises a lightening hole; the surface of the first base plate comprises three grooves; one end of each baffle plate is clamped in each three groove; the three guide plates and the four side plates are connected to one another and fixed on the faceplate.

BRIEF DESCRIPTION OF THE DRAWINGS

FIG. 17 is a sectional view taken from line L-L in FIG. 12.

Figure 1:
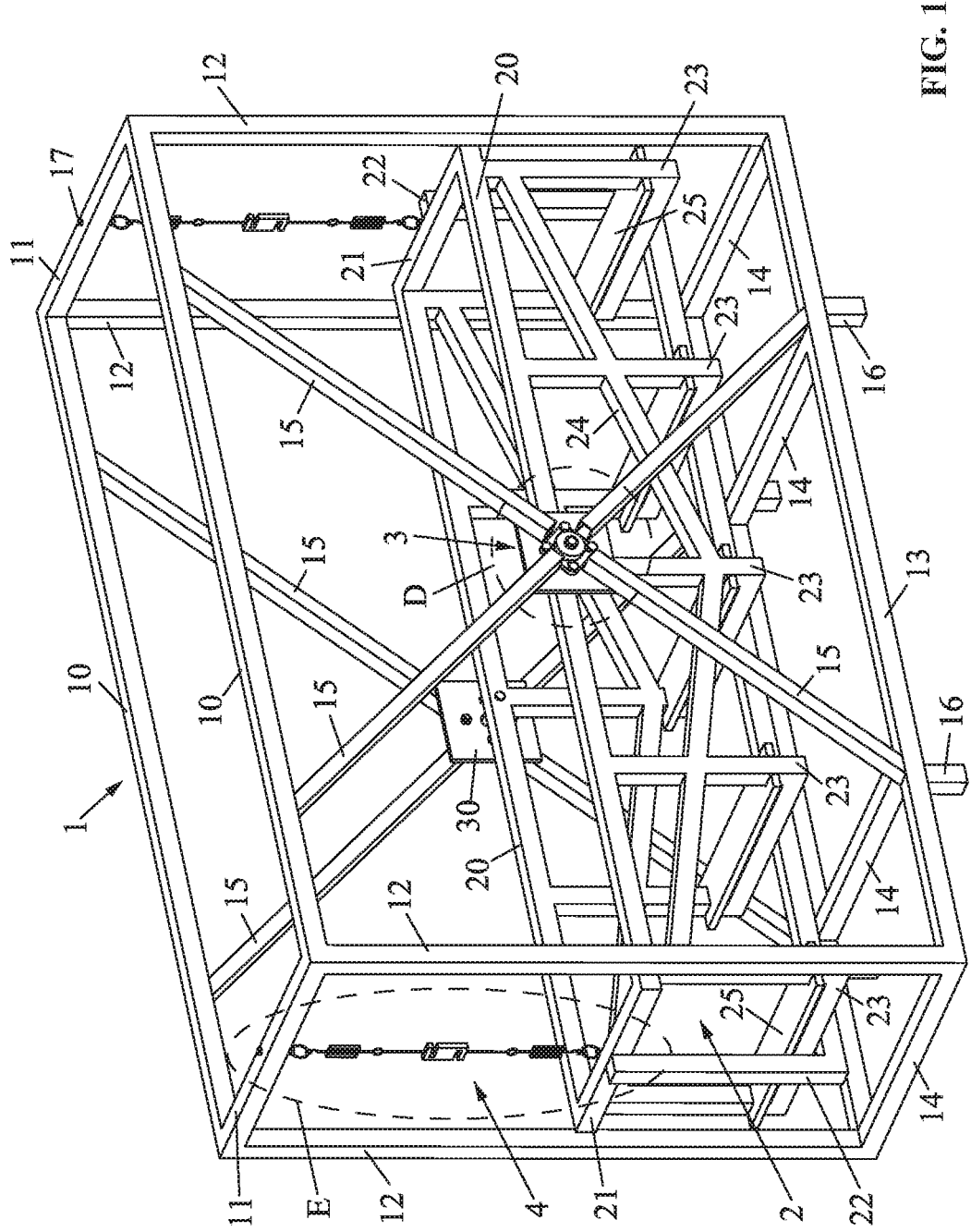
FIG. 1 is a schematic diagram of a device for measuring liquid sloshing force of a ship according to one embodiment of the disclosure.
Figure 2:
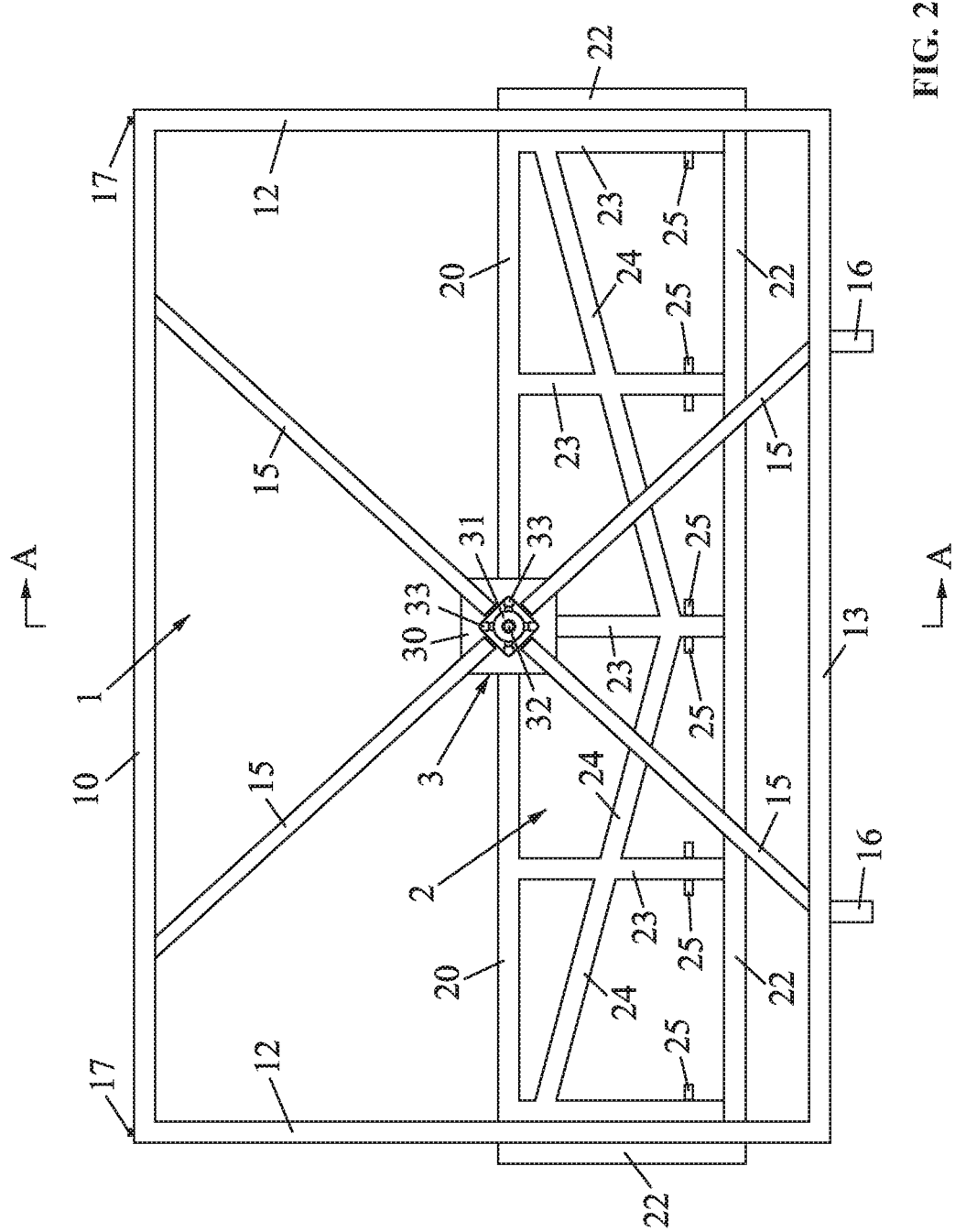
FIG. 2 is a front view of a device for measuring liquid sloshing force of a ship according to one embodiment of the disclosure.
Figure 3:
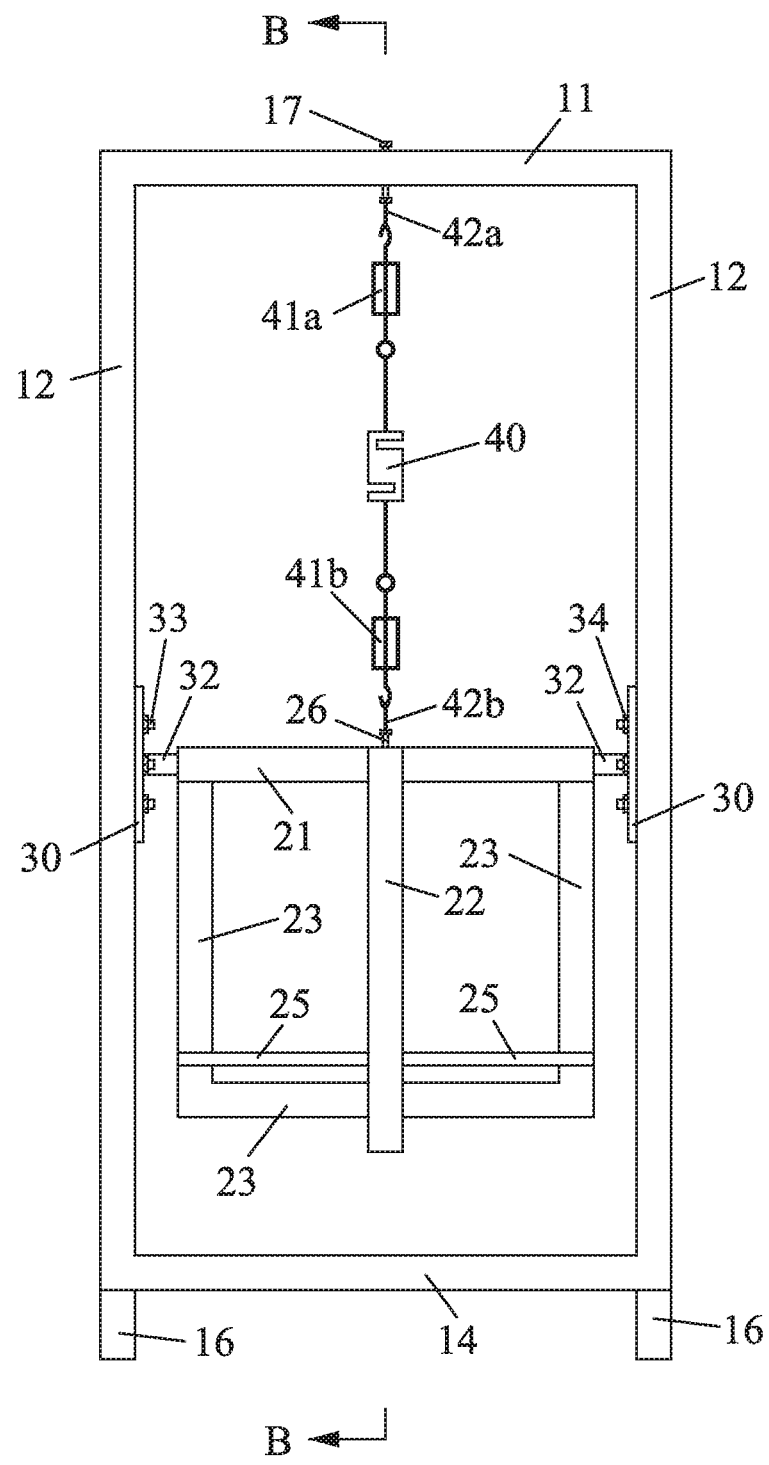
FIG. 3 is a side view of a device for measuring liquid sloshing force of a ship according to one embodiment of the disclosure.
Figure 4:
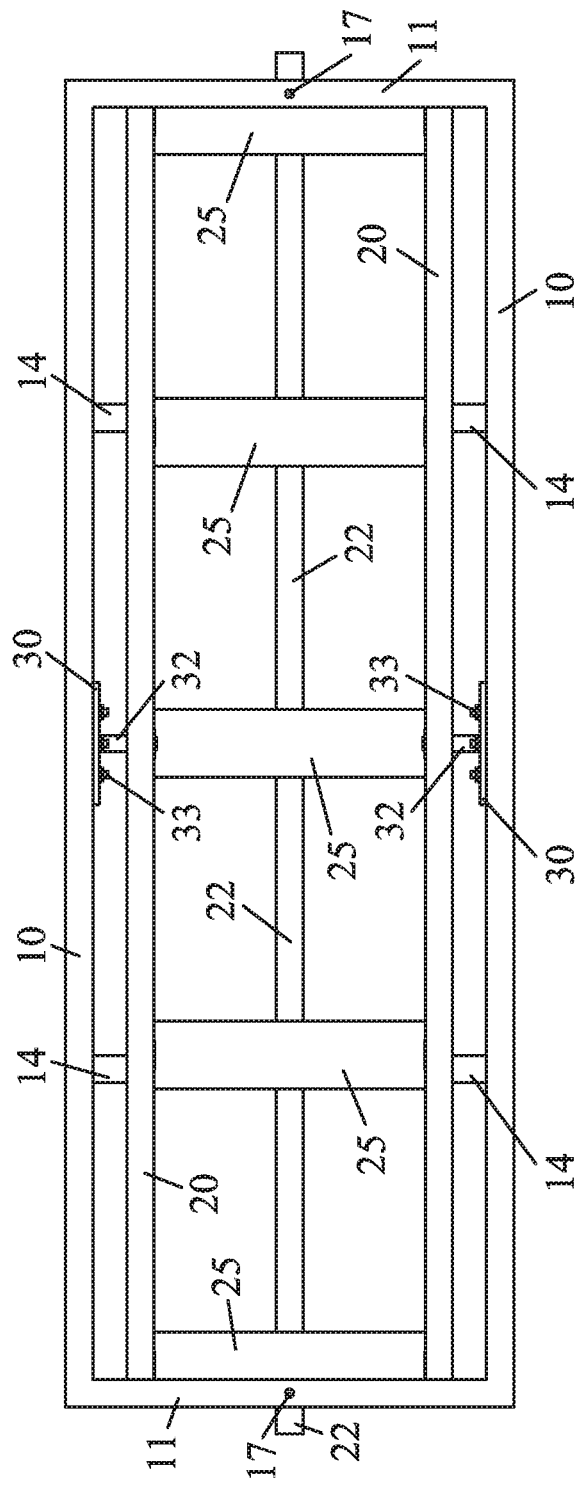
FIG. 4 is a top view of a device for measuring liquid sloshing force of a ship according to one embodiment of the disclosure.
Figure 5:
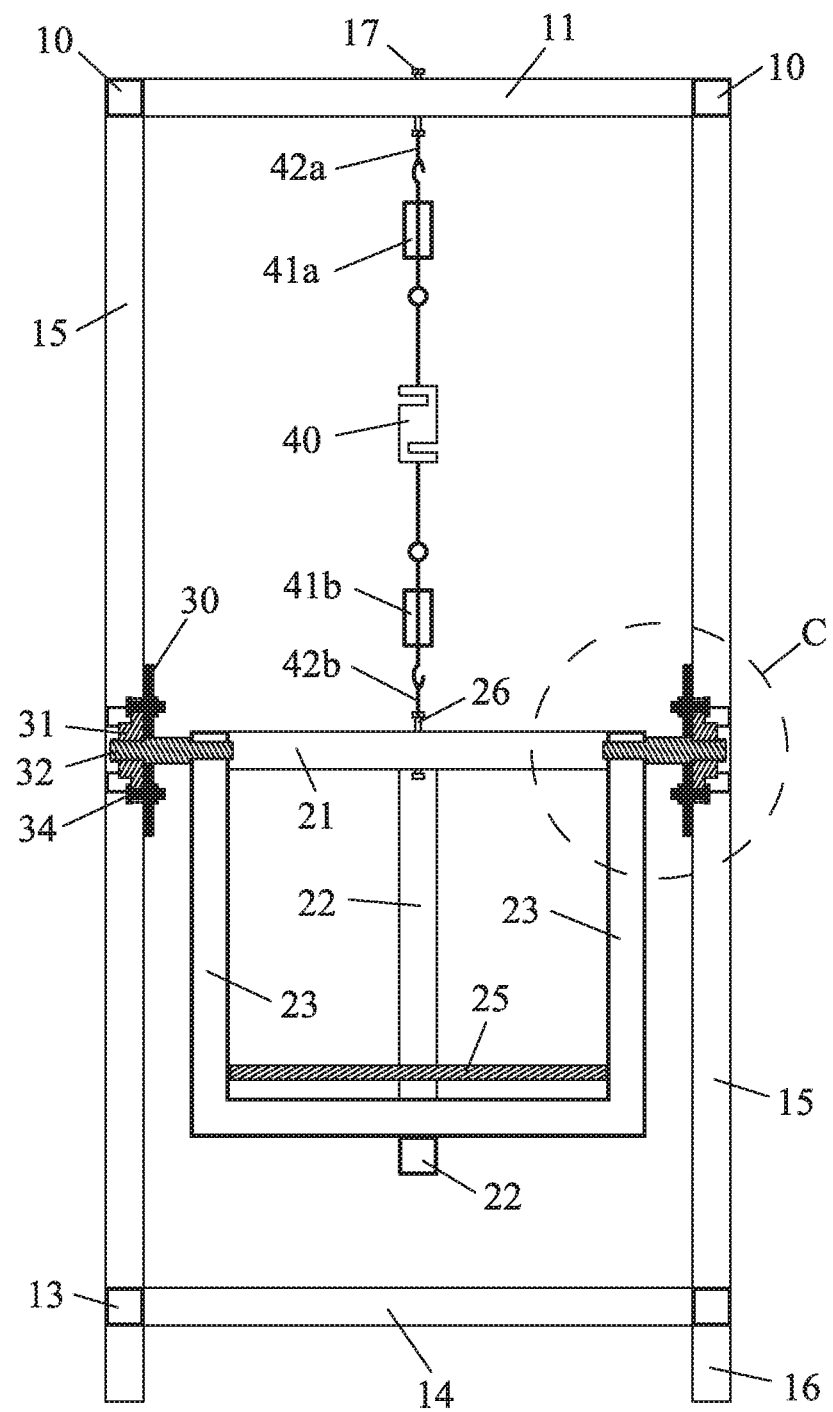
FIG. 5 is a sectional view taken from line A-A in FIG. 2.
Figure 6:
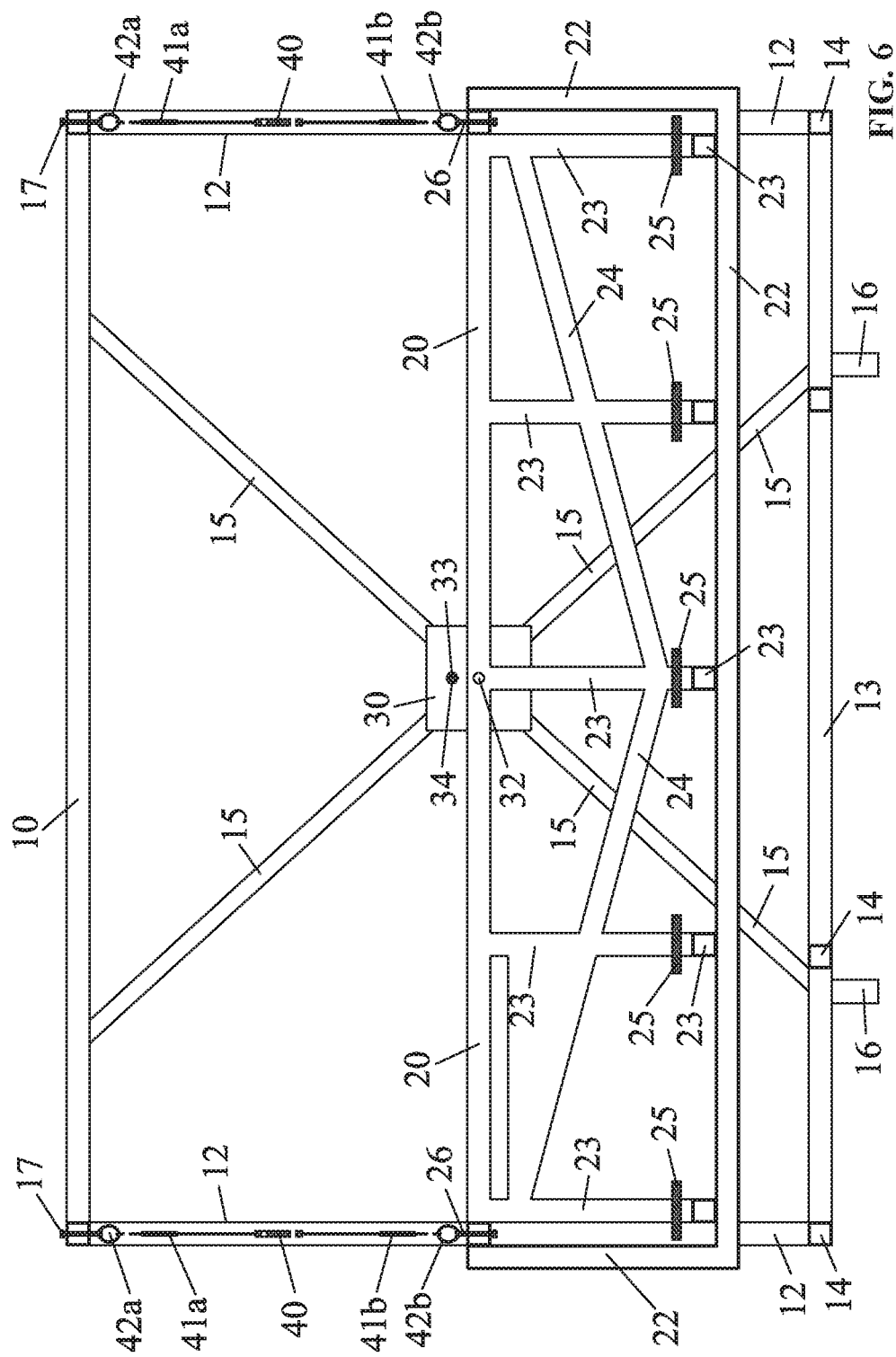
FIG. 6 is a sectional view taken from line B-B in FIG. 3.

In the drawings, the following reference numbers are used: 1. First cuboidal frame; 2. Second cuboidal frame; 3. Rotating mechanism; 4. Dynamometer; 5. Liquid tank; 10. First longitudinal beam; 11. First transverse beam; 12. Second longitudinal beam; 13. Second longitudinal beam; 14. Second transverse beam; 15. X-shaped support rod; 16. Support leg; 17. First bolt; 20. Longitudinal beam; 21. Transverse beam; 22. Longitudinal U-shaped bar; 23. Transverse U-shaped bar; 24. Diagonal brace; 25. Support plate; 26. Second bolt; 30. Connection plate; 31. Bearing seat; 32. Hinge pin; 33. Connecting bolt; 34. Nut; 40. Tensiometer; 41a. First regulator; 41b. Second regulator; 42a. First suspension ring; 42b. Second suspension ring; 50. Faceplate; 50a. Ventilation hole; 51. First side plate; 52. Second side plate; 53. First base plate; 53a. Drain hole; 53b. Groove 54. Second base plate; 54a. Lightening hole; 55. Side plate; 56. Guide plate; 57. Baffle plate.

DETAILED DESCRIPTION

To further illustrate the disclosure, embodiments detailing a device for measuring liquid sloshing are described below. It should be noted that the following embodiments are intended to describe and not to limit the disclosure.

Figure 10:
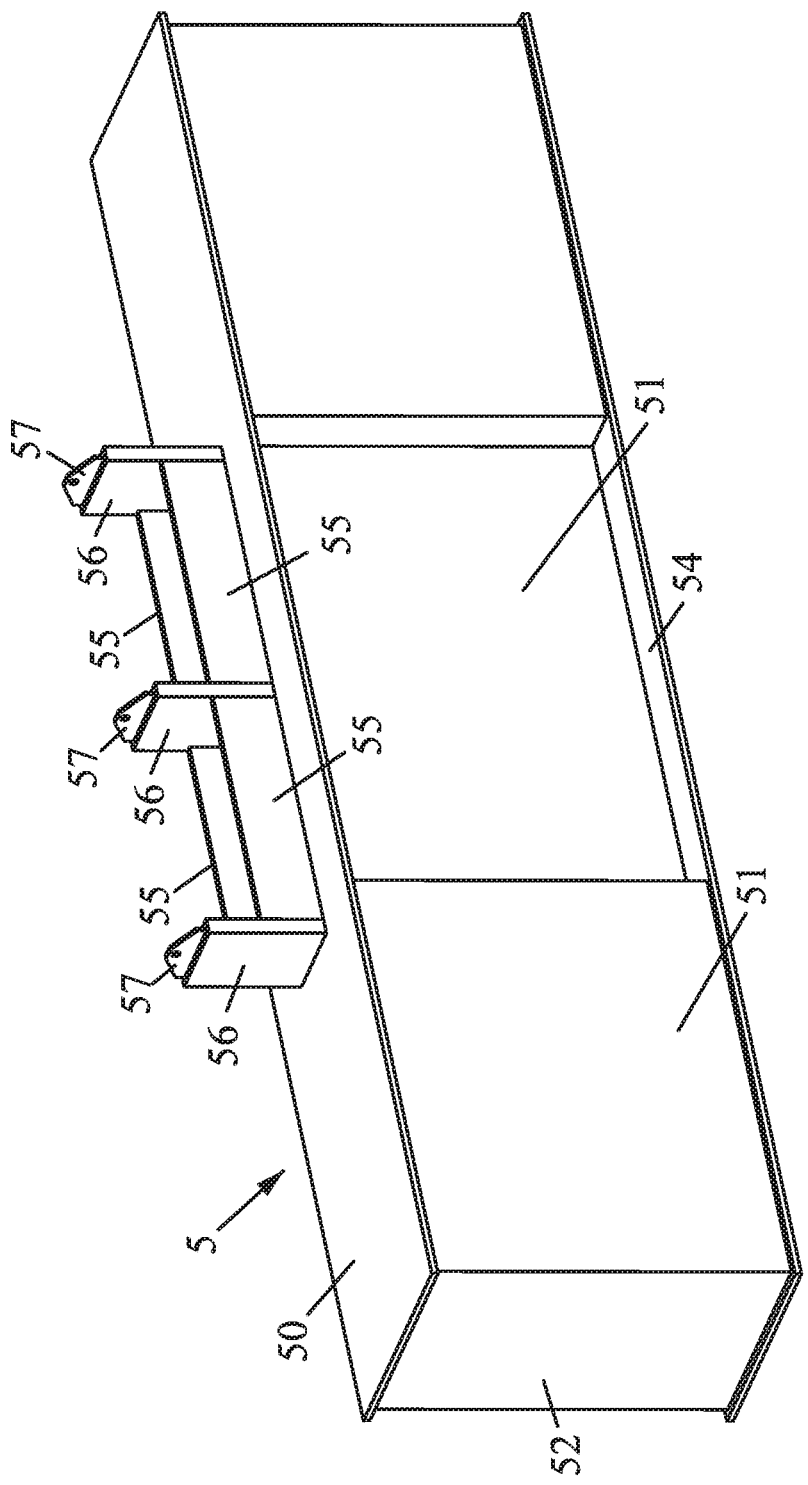
FIG. 10 is a schematic diagram of a liquid tank according to one embodiment of the disclosure.
Figure 11:
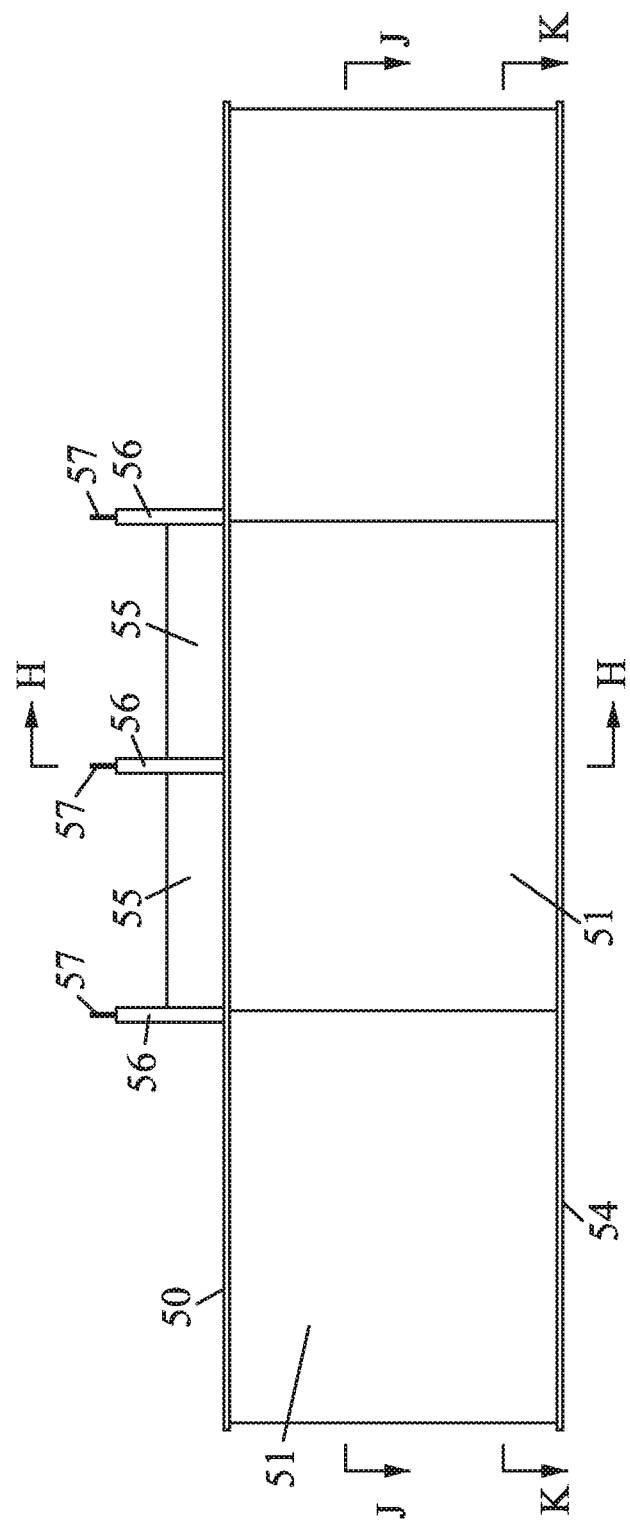
FIG. 11 is a front view of a liquid tank according to one embodiment of the disclosure.
Figure 12:
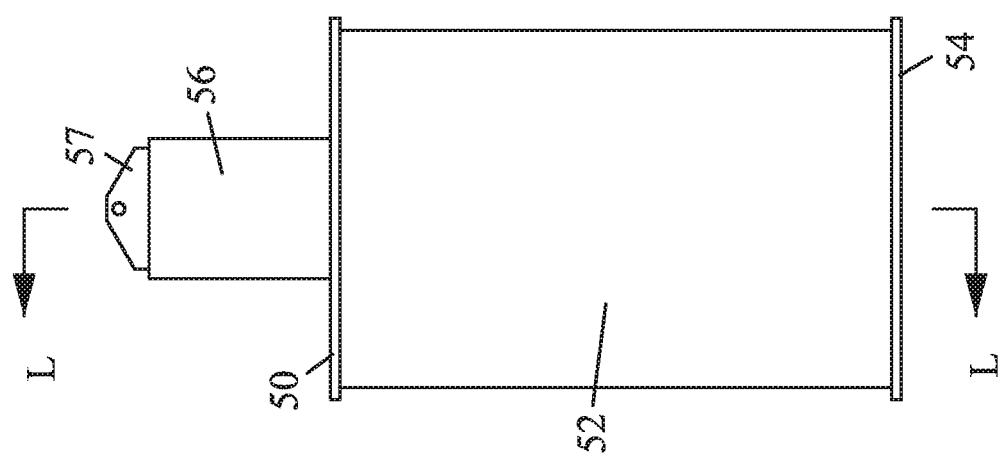
FIG. 12 is a side view of a liquid tank according to one embodiment of the disclosure.
Figure 13:
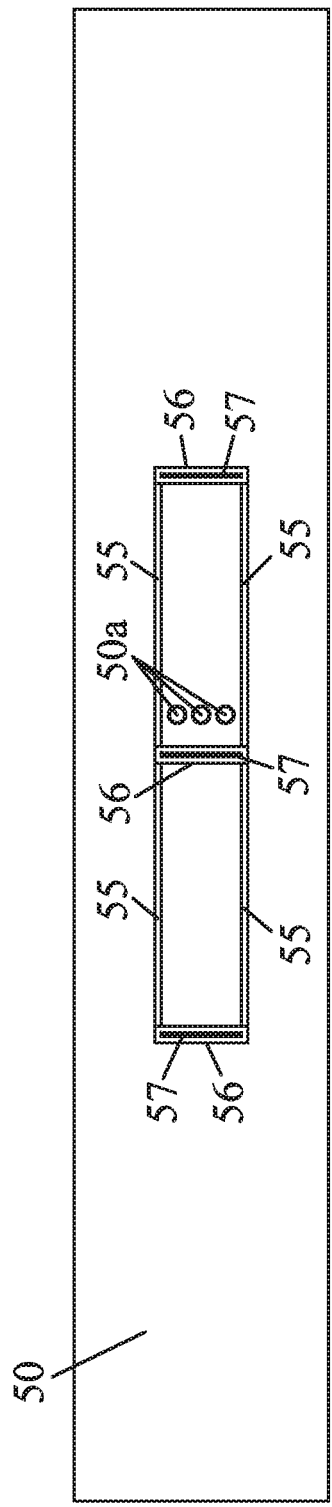
FIG. 13 is a top view of a liquid tank according to one embodiment of the disclosure.
Figure 14:
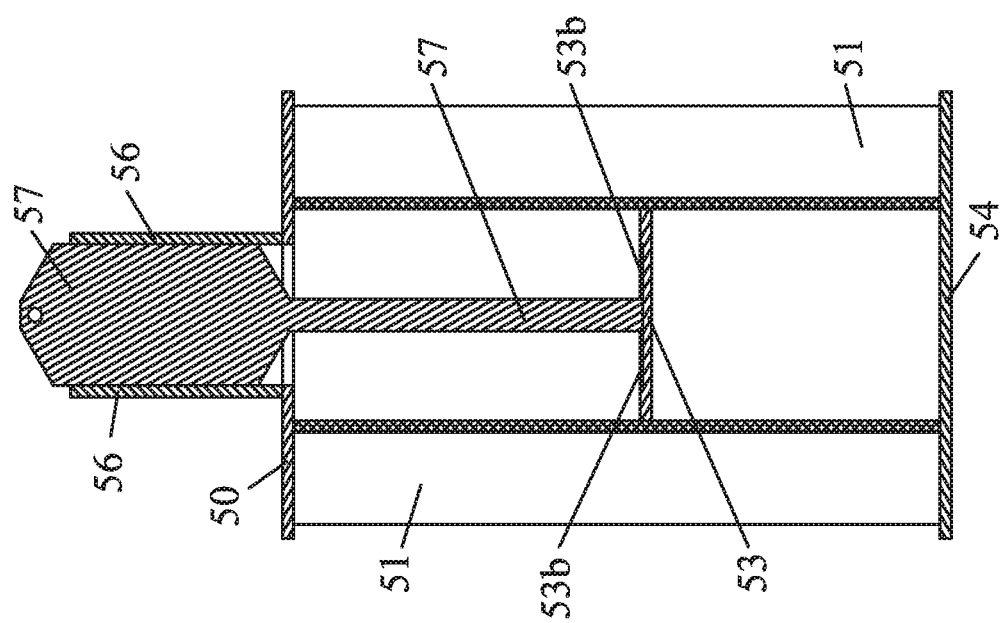
FIG. 14 is a sectional view taken from line H-H in FIG. 11.
Figure 15:
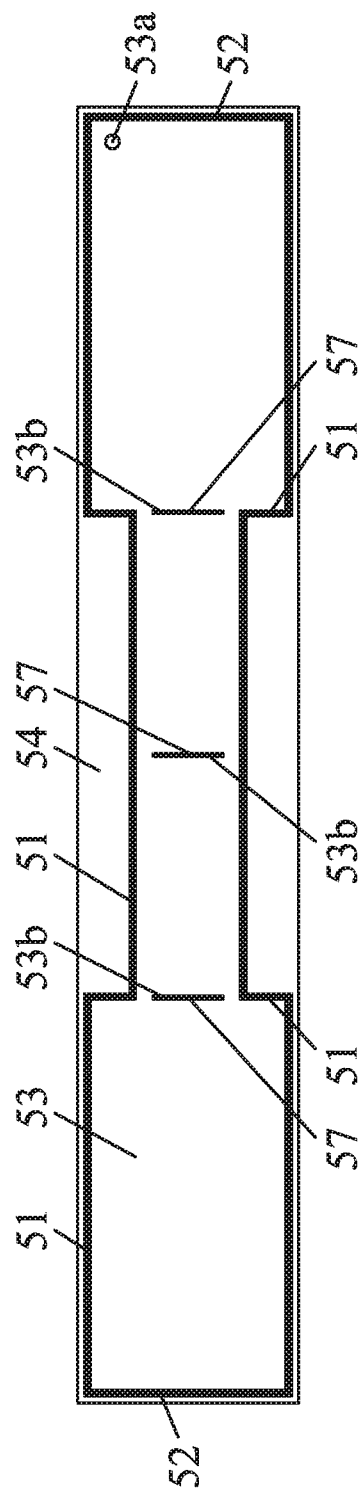
FIG. 15 is a sectional view taken from line J-J in FIG. 11.
Figure 16:
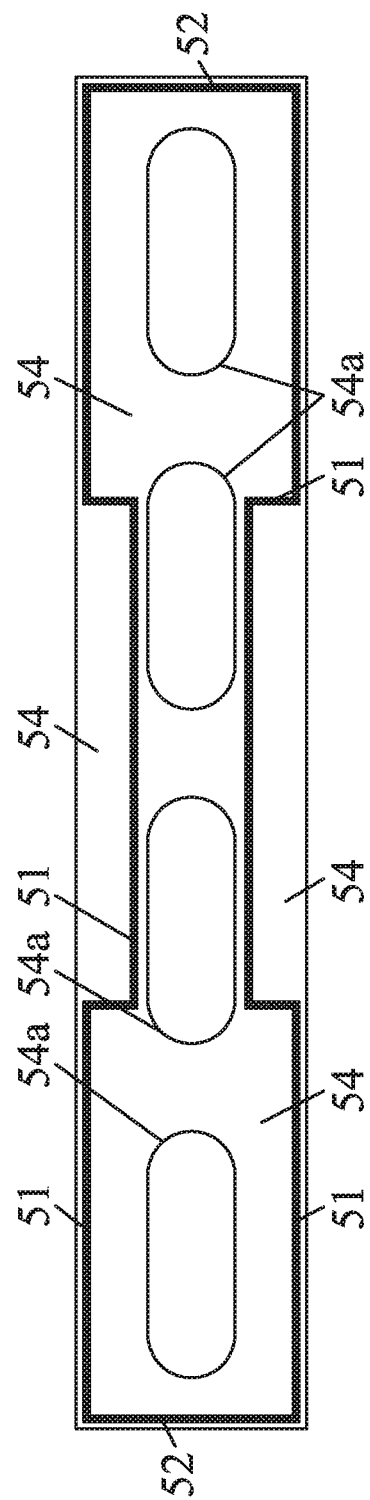
FIG. 16 is a sectional view taken from line K-K in FIG. 11.

FIG. 1 is a device for measuring liquid sloshing force of a ship and FIG. 10 shows a liquid tank of the device. The device comprises a first cuboidal frame 1, a second cuboidal frame 2, a rotating mechanism 3, a dynamometer 4, and a liquid tank 5. The disclosure employs an excitation platform as an excitation source for driving the device to slosh. The liquid tank 5 is disposed in the second cuboidal frame 2. The second cuboidal frame 2 is pivotally connected to the first cuboidal frame 1 via the rotating mechanism 3. Two ends of the dynamometer 4 are connected to the first cuboidal frame 1 and the second cuboidal frame 2, respectively. The device is placed on the excitation platform, and the liquid tank 5 is filled with liquid. The excitation platform is triggered to shake, and the liquid in the liquid tank 5 begins to slosh whereby a force is produced. The force is transmitted to the dynamometer 4 via the second cuboidal frame 2, and the tensiometer 40 measures the force.

Figure 8:
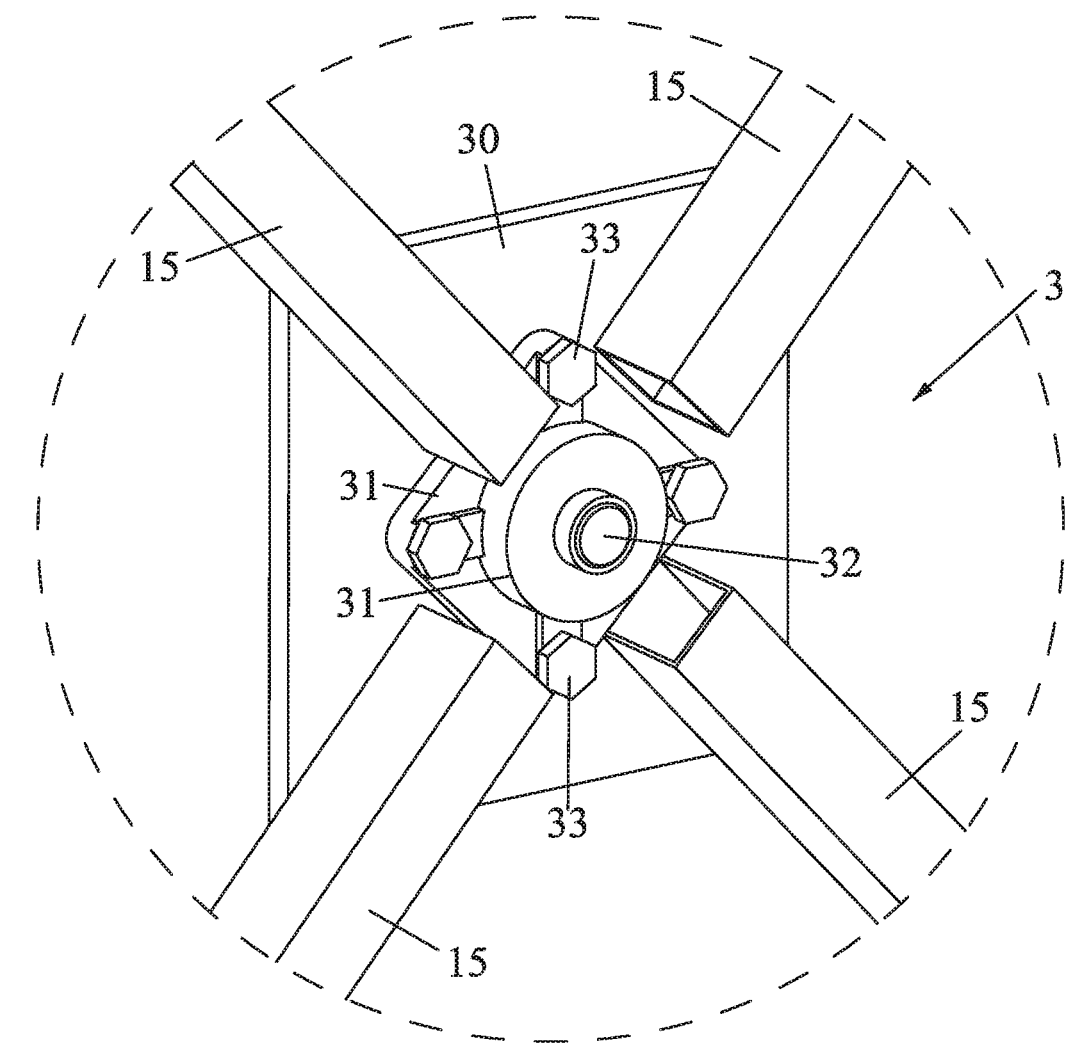
FIG. 8 is an enlarged view of part D in FIG. 1.
Figure 9:
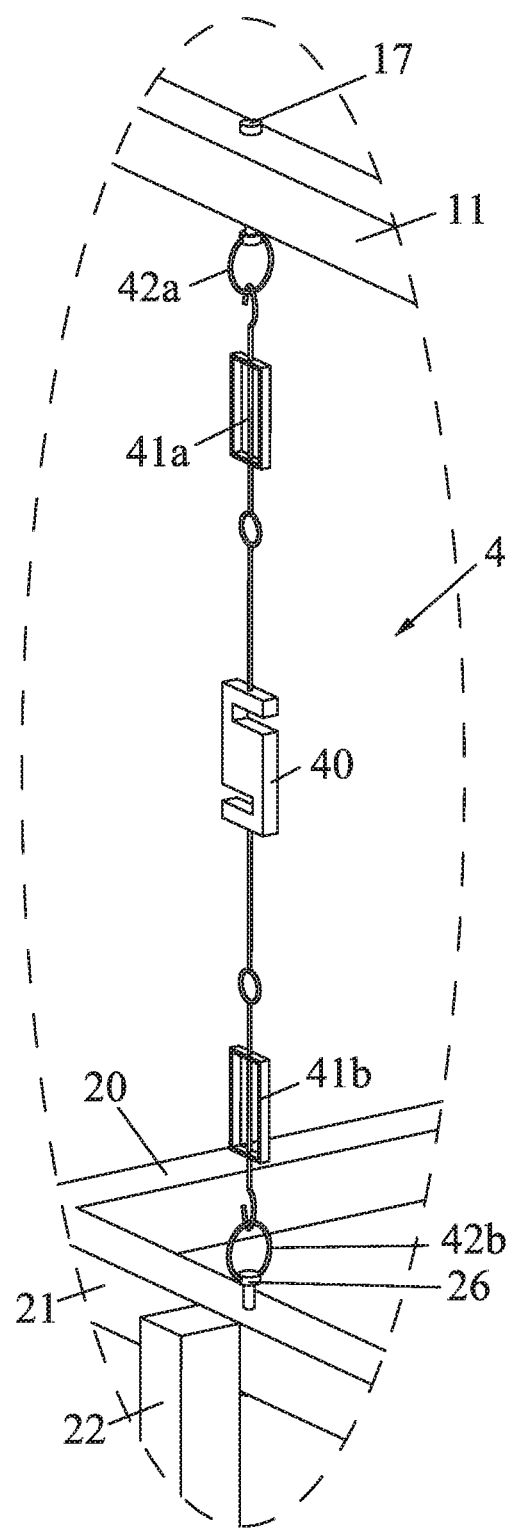
FIG. 9 is an enlarged view of part F in FIG. 1.

As shown in FIGS. 1, 2, 3, 4, and 5, the first cuboidal frame 1 comprises a first horizontal plane frame, a second horizontal plane frame, a plurality of upright tubes 12 connecting the first horizontal plane frame and the second horizontal plane frame, and an X-shaped support rod 15 disposed between the first horizontal plane frame and the second horizontal plane frame. The first horizontal plane frame comprises two first longitudinal beams 10 and two first transverse beams 11; the second horizontal plane frame comprises two second longitudinal beams 13 and two second transverse beams 14; four ends of the X-shaped support rod 15 are connected to one of the two first longitudinal beams 10 and one of the two second longitudinal beams 13, respectively; and the two second longitudinal beams 13 each comprise a support leg 16. The X-shaped support rod 15 comprises a junction and a connection plate 30 is fixed on the junction as shown in FIG. 8). The X-shaped support rod 15 is a transmission between the first cuboidal frame 1 and the second cuboidal frame 2. The dynamometer 4 further comprises a first suspension ring 42a connected to a first regulator 41a and fixed on a middle part of one of the two first transverse beams 11 via a first bolt 17 (as shown in FIG. 9). The support leg 16 is disposed on the lower end of each of the two second longitudinal beams 13 to stabilize the first cuboidal frame 1. The lower end of the X-shaped support rod 15 abuts against the position of the two second longitudinal beams 13 where the support leg 16 is disposed, thus improving the structural strength of the first cuboidal frame 1.

As shown in FIGS. 1, 2, 3, 4, and 5, the second cuboidal frame 2 comprises a third horizontal plane frame comprising two longitudinal beams 20 and two transverse beams 21, a longitudinal U-shaped bar 22 disposed between the two transverse beams, and a plurality of transverse U-shaped bars 23 disposed between the two longitudinal beams; and the plurality of transverse U-shaped bars 23 is supported by the longitudinal U-shaped bar 22. The second cuboidal frame 2 further comprises a diagonal brace 24 and a plurality of support plates 25; the plurality of transverse U-shaped bars 23 is fixed on the diagonal brace 24; and the plurality of support plates 25 is clamped between two ends of each of the plurality of transverse U-shaped bars 23, respectively. The dynamometer 4 further comprises a second suspension ring 42b connected to the second regulator 41b and fixed on a position on the middle of one of the two transverse beams 21 via a second bolt 26 (as shown in FIG. 9). The second cuboidal frame 2 is adapted to accommodate a liquid tank.

Figure 7:
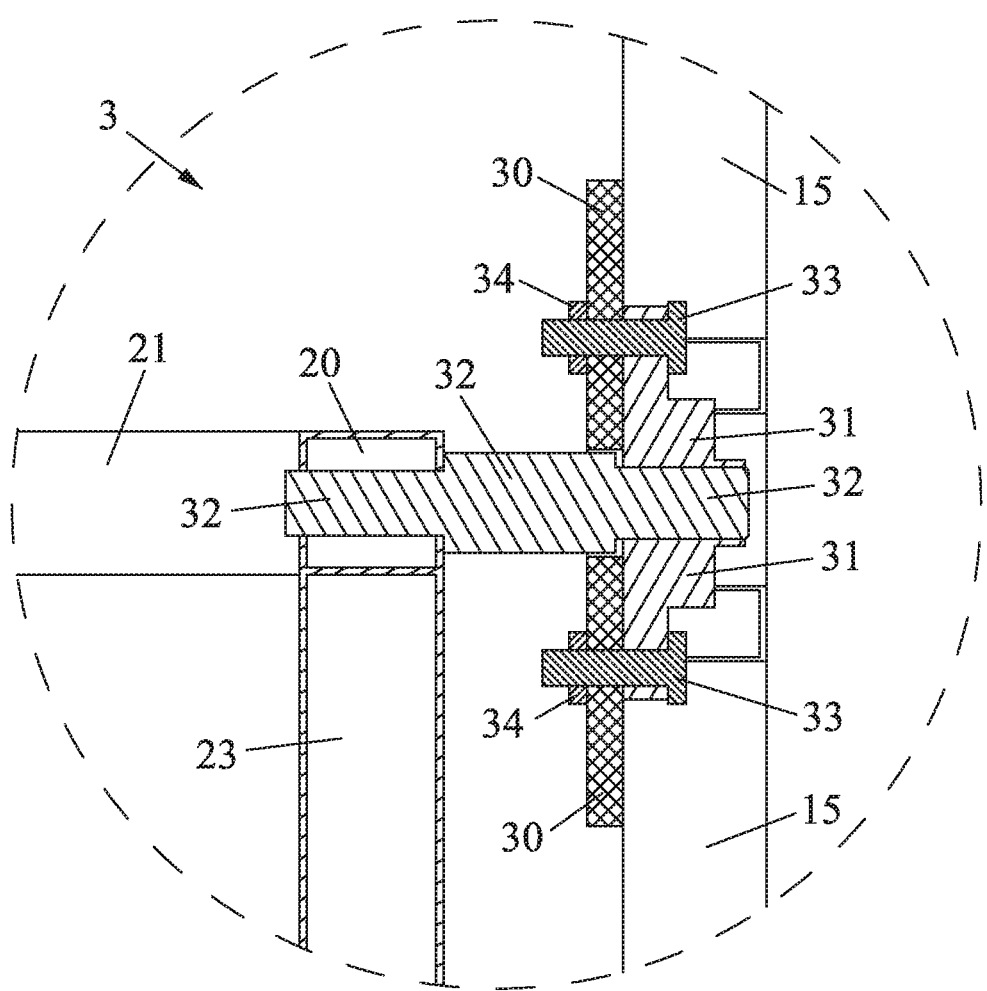
FIG. 7 is a sectional view taken from line C-C in FIG. 5.

As shown in FIGS. 1, 2, and 5-8, the rotating mechanism 3 comprises a connection plate 30, a bearing seat 31 comprising an axle hole and being fixed on the connection plate 30, and a hinge pin 32; the X-shaped support rod 15 comprises a junction and the connection plate 30 is fixed on the junction; the hinge pin 32 comprises a first end fixed on one of the two longitudinal beams 20 and a second end disposed in the axle hole of the bearing seat (as shown in FIG. 7). The bearing seat 31 is fixed on the connection plate 30 through a plurality of connecting bolts 33 and nuts 34. The connection plate 30 comprises four corners and the X-shaped support rod 15 comprises four bars respectively disposed on the four corners. The first cuboidal frame 1 is connected to the second cuboidal frame 2 via the hinge pin 32, and the second cuboidal frame 2 is swingable in the first cuboidal frame 1.

As shown in FIGS. 1, 3, 5, 6 and 9, the dynamometer 4 comprises a tensiometer 40, a first regulator 41a, and a second regulator 41b, the tensiometer 40 is disposed between the first regulator 41a and the second regulator 41b; the first regulator 41a is connected to the first horizontal plane frame, and the second regulator 41b is connected to the third horizontal plane frame. The first regulator 41a and the second regulator 41b cooperate to adjust the tension of the dynamometer 4 connecting the first cuboidal frame 1 and the second cuboidal frame 2. Two dynamometers 4 are disposed on two ends of the first cuboidal frame 1, respectively.

As shown in FIGS. 10-17, the liquid tank 5 comprises a faceplate 50, two first side plates 51, two second side plates 52, a first base plate 53, a second base plate 54, a guide plate 56, and a baffle plate 57; the faceplate 50, the two first side plates 51, the two second side plates 52 and the second base plate 54 are connected to each other to form a compartment, and the first base plate 53 is disposed in the compartment to divide the compartment into a first compartment and a second compartment. The two first side plates 51 and the two second side plates 52 are perpendicular to the second base plate 54. The guide plate 56 is vertically disposed on the faceplate 50; the guide plate 56 comprises a slot, and the first base plate 53 comprises a surface having a groove 53b; the baffle plate 57 is disposed in the slot and extends into the groove 53b; the faceplate 53 comprises a ventilation hole 50a; and the first base plate 53 comprises a drain hole 53a.

When the drain hole 53a is closed, the first base plate 53, two first side plates 51 and the two second side plates 52 are connected to each other to form a watertight compartment. The ventilation hole 50a can balance the air pressure in and outside the watertight compartment, and can function as a channel for adding a liquid. Specifically, the liquid tank 5 comprises three guide plates 56, three baffle plates 57, and four side plates 55; the second base plate 54 comprises a lightening hole 54a; the surface of the first base plate 53 comprises three grooves 53b; one end of each baffle plate 57 is clamped in each three groove 53b; the three guide plates 56 and the four side plates 55 are connected to one another and fixed on the faceplate 50. The baffle plates 57 are detachable and have the function of damping adjustment. When the liquid tank 5 sways, the liquid flows back and forth through the gaps between the baffle plates 57 and the first side plates 51. The reciprocating liquid exerts an impact on the baffle plates 57 and the side wall of watertight compartment.

Thus, the device for measuring liquid sloshing exhibits the functions of damping adjustment, air pressure adjustment and tank capacity adjustment. The beams can be made of hollow parts, thus reducing the weight of the device.

It will be obvious to those skilled in the art that changes and modifications may be made, and therefore, the aim in the appended claims is to cover all such changes and modifications.

What is claimed is:

1. A device, comprising:
   1) a first cuboidal frame, the first cuboidal frame comprising a first horizontal plane frame, a second horizontal plane frame, a plurality of upright tubes connecting the first horizontal plane frame and the second horizontal plane frame, and an X-shaped support rod disposed between the first horizontal plane frame and the second horizontal plane frame;
   2) a second cuboidal frame, the second cuboidal frame comprising a third horizontal plane frame comprising two longitudinal beams and two transverse beams, a longitudinal U-shaped bar disposed between the two transverse beams, and a plurality of transverse U-shaped bars disposed between the two longitudinal beams;
   3) a rotating mechanism, the rotating mechanism comprising a connection plate, a bearing seat comprising an axle hole and being fixed on the connection plate, and a hinge pin;
   4) a dynamometer, the dynamometer comprising a tensiometer, a first regulator, and a second regulator; and
   5) a liquid tank disposed in the second cuboidal frame, the liquid tank comprising a faceplate, two first side plates, two second side plates, a first base plate, a second base plate, a guide plate, and a baffle plate;
   wherein:
   the second cuboidal frame is pivotally connected to the first cuboidal frame via the rotating mechanism;
   the plurality of transverse U-shaped bars is supported by the longitudinal U-shaped bar;
   the X-shaped support rod comprises a junction and the connection plate is fixed on the junction; the hinge pin comprises a first end fixed on one of the two longitudinal beams and a second end disposed in the axle hole of the bearing seat;
   the tensiometer is disposed between the first regulator and the second regulator; the first regulator is connected to the first horizontal plane frame, and the second regulator is connected to the third horizontal plane frame; and
   the faceplate, the two first side plates, the two second side plates and the second base plate are connected to each other to form a compartment, and the first base plate is disposed in the compartment to divide the compartment into a first compartment and a second compartment; the guide plate is vertically disposed on the faceplate; the guide plate comprises a slot, and the first base plate comprises a surface having a groove; the baffle plate is disposed in the slot and extends into the groove; the faceplate comprises a ventilation hole; and the first base plate comprises a drain hole.

2. The device of claim 1, wherein the first horizontal plane frame comprises two first longitudinal beams and two first transverse beams; the second horizontal plane frame comprises two second longitudinal beams and two second transverse beams; four ends of the X-shaped support rod are connected to one of the two first longitudinal beams and one of the two second longitudinal beams, respectively; and the two second longitudinal beams each comprise a support leg.

3. The device of claim 1, wherein the connection plate comprises four corners and the X-shaped support rod comprises four bars respectively disposed on the four corners.

4. The device of claim 1, wherein the second cuboidal frame further comprises a diagonal brace and a plurality of support plates; the plurality of transverse U-shaped bars is fixed on the diagonal brace; and the plurality of support plates is clamped between two ends of each of the plurality of transverse U-shaped bars, respectively.

5. The device of claim 2, wherein the dynamometer further comprises a first suspension ring connected to the first regulator and fixed on a middle part of one of the two first transverse beams via a first bolt, and a second suspension ring connected to the second regulator and fixed on a middle part of one of the two transverse beams via a second bolt.

6. The device of claim 1, wherein the bearing seat is fixed on the connection plate through a plurality of connecting bolts and nuts.

7. The device of claim 1, wherein the liquid tank comprises three guide plates, three baffle plates, and four side plates; the second base plate comprises a lightening hole; the surface of the first base plate comprises three grooves; one end of each baffle plate is clamped in each three groove; the three guide plates and the four side plates are connected to one another and fixed on the faceplate.

* * * * *